US012791013B2

(12) United States Patent
Sakakibara et al.

(10) Patent No.: US 12,791,013 B2
(45) Date of Patent: Nov. 10, 2026

(54) ELECTRIC CYLINDER DEVICE

(71) Applicant: ADVICS CO., LTD., Kariya (JP)

(72) Inventors: Yuichi Sakakibara, Kariya (JP); Naru Sugimoto, Kariya (JP); Atsushi Takahashi, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/729,712

(22) PCT Filed: Jan. 18, 2023

(86) PCT No.: PCT/JP2023/001301
§ 371 (c)(1),
(2) Date: Jul. 17, 2024

(87) PCT Pub. No.: WO2023/140279
PCT Pub. Date: Jul. 27, 2023

(65) Prior Publication Data
US 2025/0154968 A1 May 15, 2025

(30) Foreign Application Priority Data
Jan. 18, 2022 (JP) ................................ 2022-005585

(51) Int. Cl.
*B60T 13/74* (2006.01)
*F04B 9/02* (2006.01)
(Continued)

(52) U.S. Cl.
CPC ................ *F04B 9/02* (2013.01); *F04B 17/03* (2013.01); *F04B 53/143* (2013.01); *F16D 65/18* (2013.01);
(Continued)

(58) Field of Classification Search
CPC .. F16H 25/10; F04B 9/02; F04B 17/03; F04B 53/143; F16D 65/18; F16D 2121/24;
(Continued)

(56) References Cited

U.S. PATENT DOCUMENTS 5,348,123 A * 9/1994 Takahashi ............ B60T 13/745 188/162
5,682,965 A * 11/1997 Prinzler .................. F16D 65/74 188/72.4
5,782,322 A * 7/1998 Hauck ..................... F16D 65/18 188/162
6,318,512 B1 11/2001 De Vries et al.
(Continued)

FOREIGN PATENT DOCUMENTS

| | | |
|---|---|---|
| CN | 210971029 U | 7/2020 |
| CN | 211642150 U | 10/2020 |
| JP | 2000266149 A | 9/2000 |

OTHER PUBLICATIONS

International Search Report (PCT/ISA/210) with translation and Written Opinion mailed Apr. 11, 2023, by the Japan Patent Office as the International Searching Authority for International Application No. PCT/JP2023/001301. (9 pages).

*Primary Examiner* — Dustin T Nguyen
(74) *Attorney, Agent, or Firm* — BUCHANAN INGERSOLL & ROONEY PC

(57) ABSTRACT

In an electric cylinder device including a third gear that rotates by receiving rotation of an electric motor and a linear motion conversion mechanism that converts the rotation of the third gear into linear motion of a piston inside a cylinder, a nut, which is a linear motion portion of the linear motion conversion mechanism, and the piston are connected in a state in which relative displacement in a radial direction is allowed.

1 Claim, 11 Drawing Sheets

(51) Int. Cl.

| | |
|---|---|
| ***F04B 17/03*** | (2006.01) |
| ***F04B 53/14*** | (2006.01) |
| ***F16D 65/18*** | (2006.01) |
| ***F16D 125/40*** | (2012.01) |
| *F16D 121/24* | (2012.01) |
| *F16D 125/06* | (2012.01) |
| *F16D 125/08* | (2012.01) |
| *F16D 125/48* | (2012.01) |
| *F16D 131/00* | (2012.01) |
| *F16H 25/10* | (2006.01) |

(52) U.S. Cl.
CPC ......... *B60T 13/745* (2013.01); *F16D 2121/24* (2013.01); *F16D 2125/06* (2013.01); *F16D 2125/08* (2013.01); *F16D 2125/40* (2013.01); *F16D 2125/48* (2013.01); *F16D 2131/00* (2013.01); *F16H 25/10* (2013.01)

(58) Field of Classification Search
CPC ............. F16D 2125/06; F16D 2125/08; F16D 2125/40; F16D 2125/48; F16D 2131/00; B60T 13/745
See application file for complete search history.

(56) References Cited

U.S. PATENT DOCUMENTS

| | | | | |
|---|---|---|---|---|
| 6,457,783 | B1 * | 10/2002 | Schanzenbach | F16D 65/18 303/166 |
| 7,559,413 | B2 * | 7/2009 | Haffelder | B60T 13/588 188/72.4 |
| 8,607,939 | B2 | 12/2013 | Osterlanger et al. | |
| 8,776,958 | B2 * | 7/2014 | Shiraki | F16D 65/567 188/71.9 |
| 9,604,605 | B2 * | 3/2017 | Shim | B60T 13/686 |
| 10,412,445 | B2 * | 9/2019 | Bates | H04N 21/439 |
| 10,697,510 | B2 * | 6/2020 | Baehrle-Miller | B60T 13/741 |
| 11,208,088 | B2 | 12/2021 | Micke | |
| 2004/0045431 | A1 | 3/2004 | Schmitt et al. | |
| 2004/0112690 | A1 | 6/2004 | Sekiguchi | |
| 2006/0267402 | A1 * | 11/2006 | Leiter | B60T 13/741 303/20 |
| 2007/0062769 | A1 * | 3/2007 | Noh | B60T 13/588 188/162 |
| 2013/0327606 | A1 | 12/2013 | Platzer et al. | |
| 2023/0415719 | A1 | 12/2023 | Choi et al. | |
| 2024/0409078 | A1 | 12/2024 | Hagspiel et al. | |
| 2025/0305490 | A1 | 10/2025 | Sakakibara et al. | |
| 2025/0305491 | A1 | 10/2025 | Sakakibara et al. | |
| 2025/0305492 | A1 | 10/2025 | Sakakibara et al. | |

* cited by examiner

ELECTRIC CYLINDER DEVICE

TECHNICAL FIELD

The present disclosure relates to an electric cylinder device.

BACKGROUND ART

There is known an electric cylinder device that converts rotation of an electric motor into linear motion and outputs the linear motion as seen in PTL 1. As the electric cylinder device, there is an electric cylinder device that includes a cylinder and a piston disposed inside the cylinder and that converts rotation of an electric motor into linear motion and moves the piston linearly in the cylinder.

CITATION LIST

Patent Literature

PTL 1: JP2000-266149A

SUMMARY

Technical Problem

When a cylinder and a piston are assembled in a state in which a center position is deviated during assembly of an electric cylinder device, the piston is brought into one-side contact with the cylinder and a load in a radial direction is generated. When the electric cylinder device is driven in a state in which the load in the radial direction is generated, uneven wear may occur on components of the electric cylinder device due to the load. Therefore, high accuracy is required for the assembly of the components of the electric cylinder device, which is a factor of reducing productivity of the electric cylinder device.

Solution to Problem

An electric cylinder device for solving the above problem includes: a piston disposed inside a cylinder; a rotation input component that rotates by receiving rotation of an electric motor; a linear motion conversion mechanism that includes a rotation portion that is rotated due to transmission of the rotation of the rotation input component and a linear motion portion that acts on linear motion of the piston by linearly moving according to the rotation of the rotation portion; and a housing in which the cylinder is provided and in which the piston, the rotation input component, and the linear motion conversion mechanism are accommodated. A first component and a second component, which are two components among components of the electric cylinder device, are allowed to undergo relative displacement in a radial direction that is a direction orthogonal to an axial direction of the piston. The first component is a component that relatively displaces the piston with respect to the cylinder in the radial direction according to relative displacement with respect to the second component in the radial direction.

The piston of the electric cylinder device configured as described above is allowed to undergo relative displacement with respect to the cylinder in the radial direction. On the other hand, a load in the radial direction acting between the piston and the cylinder is alleviated by the relative displacement in the radial direction. Therefore, in the electric cylinder device, uneven wear on the components of the electric cylinder device due to deviation of a center position of the piston and the cylinder hardly occurs.

DESCRIPTION OF EMBODIMENTS

First Embodiment

Hereinafter, a first embodiment in which an electric cylinder device is implemented will be described with reference to FIGS. 1 and 2. An electric cylinder device 10 according to the embodiment is implemented as a device for generating a hydraulic pressure for generating a braking force of a vehicle.

<Configuration of Electric Cylinder Device 10>

Figure 1:
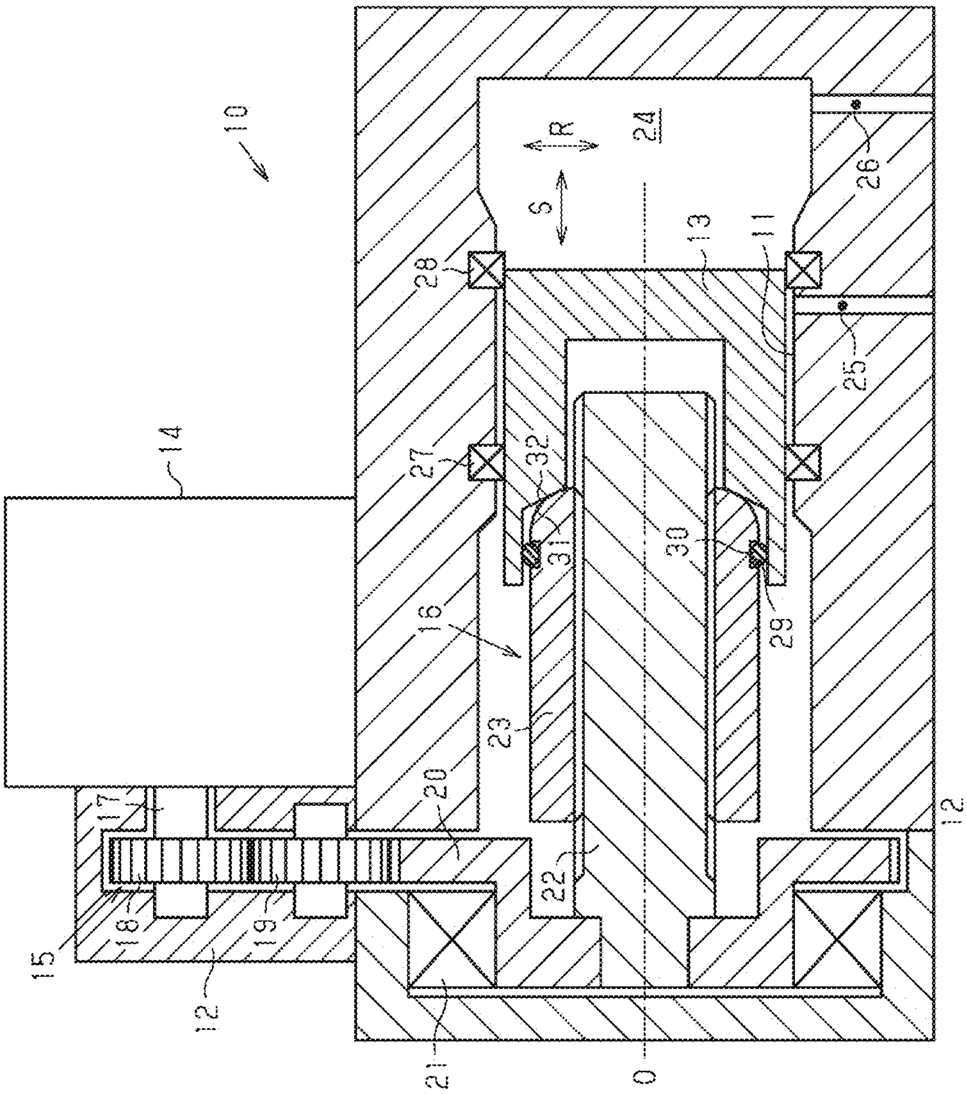
FIG. 1 is a cross-sectional view of an electric cylinder device according to a first embodiment.

As shown in FIG. 1, the electric cylinder device 10 according to the embodiment includes a housing 12 in which a cylinder 11 is provided, and a piston 13 disposed in the cylinder 11 so as to be linearly movable in an axial direction. In addition, the electric cylinder device 10 includes an electric motor 14, a rotation transmission mechanism 15, and a a linear motion conversion mechanism 16. The piston 13, the rotation transmission mechanism 15, and the linear motion conversion mechanism 16 are disposed inside the housing 12. In the electric cylinder device 10 according to the embodiment, the electric motor 14 is attached to an outer periphery of the housing 12. The rotation transmission mechanism 15 and the linear motion conversion mechanism 16 are accommodated in an internal space of the housing 12 connected to the cylinder 11.

The rotation transmission mechanism 15 is a mechanism that transmits rotation of the electric motor 14 to the linear motion conversion mechanism 16. The electric cylinder device 10 according to the embodiment includes a gear mechanism including three gears as the rotation transmission mechanism 15. That is, the three gears are a first gear 18 connected to a motor shaft 17 which is an output shaft of the electric motor 14, a third gear 20 connected to the linear motion conversion mechanism 16, and a second gear 19 interposed between the first gear 18 and the third gear 20. The third gear 20 is a gear having a larger number of teeth more than that of the first gear 18. Accordingly, the rotation of the electric motor 14 is decelerated and transmitted to the linear motion conversion mechanism 16. The third gear 20 is disposed inside the housing 12 in a state of being rotatably supported by a bearing component 21. In the embodiment, the third gear 20 corresponds to a rotation input component that rotates by receiving the rotation of the electric motor 14.

The linear motion conversion mechanism 16 is a mechanism that converts the rotation of the electric motor 14 transmitted through the rotation transmission mechanism 15 into the linear motion of the piston 13 inside the cylinder 11. The electric cylinder device 10 according to the embodiment includes a feed screw mechanism including a screw shaft 22 and a nut 23 as the linear motion conversion mechanism 16. The screw shaft 22 is integrally connected to the third gear 20 so as to rotate. In addition, the nut 23 is connected to the piston 13. A connection structure between the piston 13 and the nut 23 will be described in detail later. The nut 23 linearly moves in an extending direction of a rotation axis O, that is, in the axial direction of the piston 13 according to the rotation of the screw shaft 22. Then, the nut 23 linearly moves to act on the linear motion of the piston 13. In the electric cylinder device 10 according to the embodiment, the screw shaft 22 corresponds to a rotation portion of the linear motion conversion mechanism 16, and the nut 23 corresponds to a linear motion portion of the linear motion conversion mechanism 16.

Inside the cylinder 11, a fluid chamber 24 into which brake fluid is introduced is partitioned by the piston 13. A volume of the fluid chamber 24 changes by a moving position of the piston 13 in the cylinder 11. In the following description, a direction, in which the volume of the fluid chamber 24 is decreased, among the direction of the linear motion of the piston 13 in the cylinder 11, that is, a linear motion direction S of the piston 13 is referred to as a forward side of the electric cylinder device 10. In addition, a direction, in which the volume of the fluid chamber 24 is increased, among the linear motion direction S is referred to as a rearward side of the electric cylinder device 10. Further, the linear motion of the piston 13 forward in the cylinder 11 is referred to as advance of the piston 13, and the linear motion of the piston 13 rearward is referred to as retreat of the piston 13. The moving position of the piston 13 when the piston 13 retreats most in a linear motion range in the cylinder 11 is referred to as a most retreated position of the piston 13.

The housing 12 is provided with two ports communicating with the cylinder 11. That is, the two ports are an input port 25 for introducing the brake fluid into the fluid chamber 24 and an output port 26 for dispensing the brake fluid from the fluid chamber 24. Seal components 27 and 28 are respectively disposed in a portion behind an opening of the input port 25 in an inner wall of the cylinder 11 and in a portion in front of the opening. The seal components 27 and 28 are components for preventing the brake fluid from leaking from the fluid chamber 24 through a clearance between the cylinder 11 and the piston 13. The input port 25 is in a state of communicating with the fluid chamber 24 when the piston 13 is located at the most retreated position. When the piston 13 advances from the most retreated position by a certain amount, the opening of the input port 25 to the cylinder 11 is blocked by the piston 13. Accordingly, the communication between the input port 25 and the fluid chamber 24 is blocked. On the other hand, the communication between the output port 26 and the fluid chamber 24 is maintained regardless of the moving position of the piston 13.

In the electric cylinder device 10, the linear motion conversion mechanism 16 converts the rotation of the electric motor 14 transmitted through the rotation transmission mechanism 15 into linear motion and transmits the linear motion to the piston 13, thereby moving the piston 13 in the cylinder 11. Only the output port 26 communicates with the fluid chamber 24 when the piston 13 blocks the opening of the input port 25 to the cylinder 11. When the piston 13 advances in this state, the brake fluid in the fluid chamber 24 is pressed by the piston 13 and is dispensed from the output port 26. A braking device provided with the electric cylinder device 10 transmits the pressure of the piston 13 to a friction member through the brake fluid dispensed from the output port 26 to generate the braking force of the vehicle.

<Connection Structure of Piston 13 and Nut 23>

Next, the connection structure of the piston 13 and the nut 23 will be described in detail with reference to FIG. 2. In the following description, a direction perpendicular to the linear motion direction S of the piston 13 in the cylinder 11 is referred to as a radial direction R.

Figure 2:
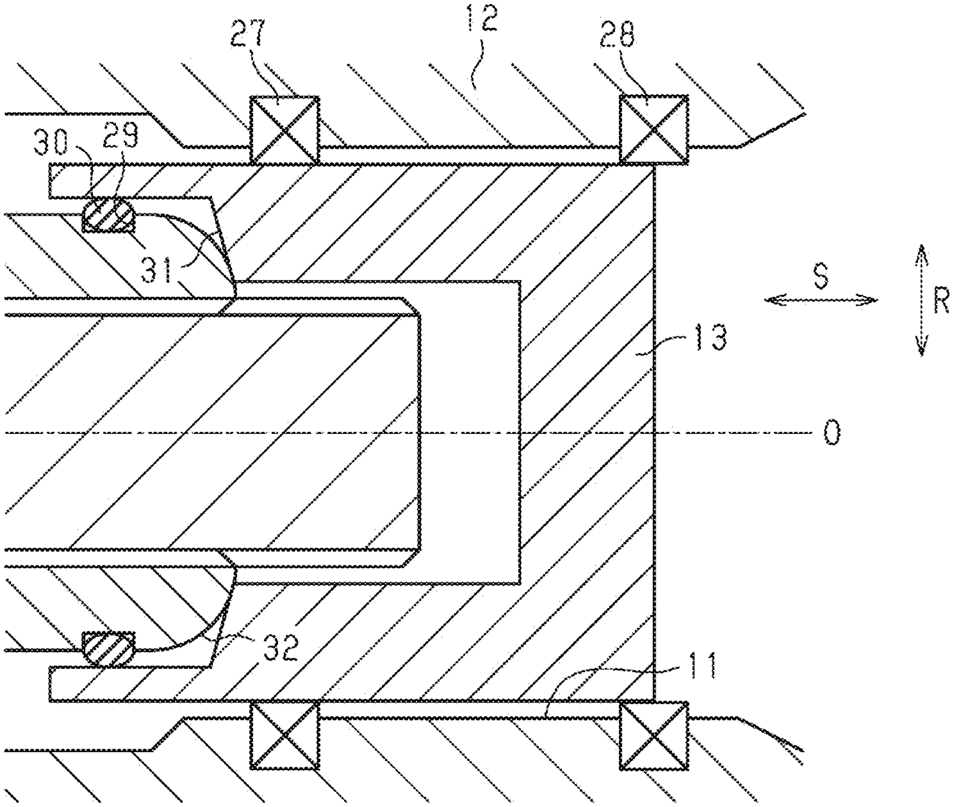
FIG. 2 is a cross-sectional view of a piston of the electric cylinder device in FIG. 1 and a periphery thereof.

As shown in FIG. 2, a recessed portion 29 into which a front end portion of the nut 23 is inserted is provided at a rear end portion of the piston 13. The recessed portion 29 has an inner diameter larger than an outer diameter of the nut 23. That is, the rear end portion of the piston 13 and the front end portion of the nut 23 overlap each other in the linear motion direction S. A seal ring 30 as an elastic component is sandwiched in a gap between the recessed portion 29 and the nut 23 in the radial direction R.

In addition, the recessed portion 29 has a tapered surface 31 inclined toward an inner side in the radial direction R as it goes forward. On the other hand, a front end of the nut 23 is formed on a protruding spherical surface 32. The piston 13 and the nut 23 are assembled in a state in which the protruding spherical surface 32 of the nut 23 is in line contact with the tapered surface 31 of the recessed portion 29. In the embodiment, the tapered surface 31 corresponds to a contact surface in contact with an end surface of the linear motion portion in the linear motion direction S. In addition, the protruding spherical surface 32 of the nut 23 corresponds to the end surface of the linear motion portion. Further, in the embodiment, the piston 13 corresponds to a first component, and the nut 23, which is the linear motion portion of the linear motion conversion mechanism 16, corresponds to a second component.

Operation and Effect of First Embodiment

An operation and effect of the embodiment will be described. During assembly of the electric cylinder device 10, the third gear 20 and the linear motion conversion mechanism 16 may be assembled to the housing 12 in a state in which a center position of the cylinder 11 is deviated. The deviation of the center position here means that the rotation axis O of the third gear 20 and the linear motion conversion mechanism 16 is deviated in parallel to a central axis of the cylinder 11. At this time, when the relative displacement of the piston 13 with respect to the cylinder 11 in the radial direction R is not allowed at all, a load in the radial direction R acts between the cylinder 11 and the piston 13. The load may cause uneven wear on the components of the electric cylinder device 10, such as the cylinder 11, the piston 13, the screw shaft 22, and the nut 23.

On the contrary, the piston 13 of the electric cylinder device 10 according to the embodiment is connected to the nut 23, in a state in which the relative displacement in the radial direction R is allowed, through elastic deformation of the seal ring 30. On the other hand, the nut 23 is assembled to the housing 12, in which the cylinder 11 is provided, through the screw shaft 22, the third gear 20, and the bearing component 21. In the electric cylinder device 10, the piston 13 is assembled to the electric cylinder device 10 in a state in which the relative displacement with respect to the cylinder 11 in the radial direction R is allowed. Therefore, even when the center position is deviated as described above, the load in the radial direction R acting between the cylinder 11 and the piston 13 is alleviated by the piston 13 being relatively displaced with respect to the cylinder 11 in the radial direction R. Therefore, the electric cylinder device 10 according to the embodiment has an effect of preventing the uneven wear on the components due to the deviation of the center position of the piston 13 and the cylinder 11.

In addition, during the assembly of the electric cylinder device 10, the third gear 20 and the linear motion conversion mechanism 16 may be assembled to the housing 12 in a state in which the rotation axis O is inclined with respect to the central axis of the cylinder 11. According to the inclination of the rotation axis O with respect to the central axis of the cylinder 11, a load in the radial direction R is generated between the cylinder 11 and the piston 13, and uneven wear may occur on the components of the electric cylinder device 10. In this regard, in the embodiment, contact between the nut 23 and the piston 13 in the linear motion direction S is line contact between the tapered surface 31 and the protruding spherical surface 32. Accordingly, inclined motion of the piston 13 with respect to the nut 23 is allowed. Therefore, the electric cylinder device 10 according to the embodiment has an effect of preventing the uneven wear on the components due to the inclination of the rotation axis O with respect to the central axis of the cylinder 11.

In the electric cylinder device 10, when the piston 13 advances in the cylinder 11, a compression reaction force of the brake fluid in the fluid chamber 24 is applied to the piston 13. Therefore, when the piston 13 advances, a thrust larger than that during retreat is required. In the embodiment, the piston 13 has the tapered surface 31 in contact with the protruding spherical surface 32 which is an end surface of the nut 23 in the linear motion direction S. Further, the seal ring 30, which is the elastic component, is interposed in a gap between the piston 13 and the nut 23 in the radial direction R. In the embodiment, when the piston 13 advances, the protruding spherical surface 32 of the nut 23 directly applies pressure to the tapered surface 31 of the piston 13, so that the thrust is transmitted from the nut 23 to the piston 13. On the other hand, when the piston 13 linearly moves rearward, the thrust is transmitted from the nut 23 to the piston 13 through friction between the nut 23 and the seal ring 30 and friction between the piston 13 and the seal ring 30. In the transmission through the friction of the seal ring 30, the thrust that can be transmitted from the nut 23 to the piston 13 is smaller than that during advance. However, as described above, since the thrust required for retreat is not as large as that required for advance, the thrust required for retreating the piston 13 can be sufficiently transmitted through the friction of the seal ring 30. In this case, the piston 13 can be connected to the nut 23 simply by inserting the front end portion of the nut 23, to an outer periphery of which the seal ring 30 is attached, into the recessed portion 29 of the piston 13. Therefore, it is easy to connect the piston 13 and the nut 23 during the assembly of the electric cylinder device 10.

Modification of First Embodiment

The embodiment can be modified and implemented as follows. The embodiment and the following modifications can be implemented in combination with each other within a technically consistent range.

Figure 3:
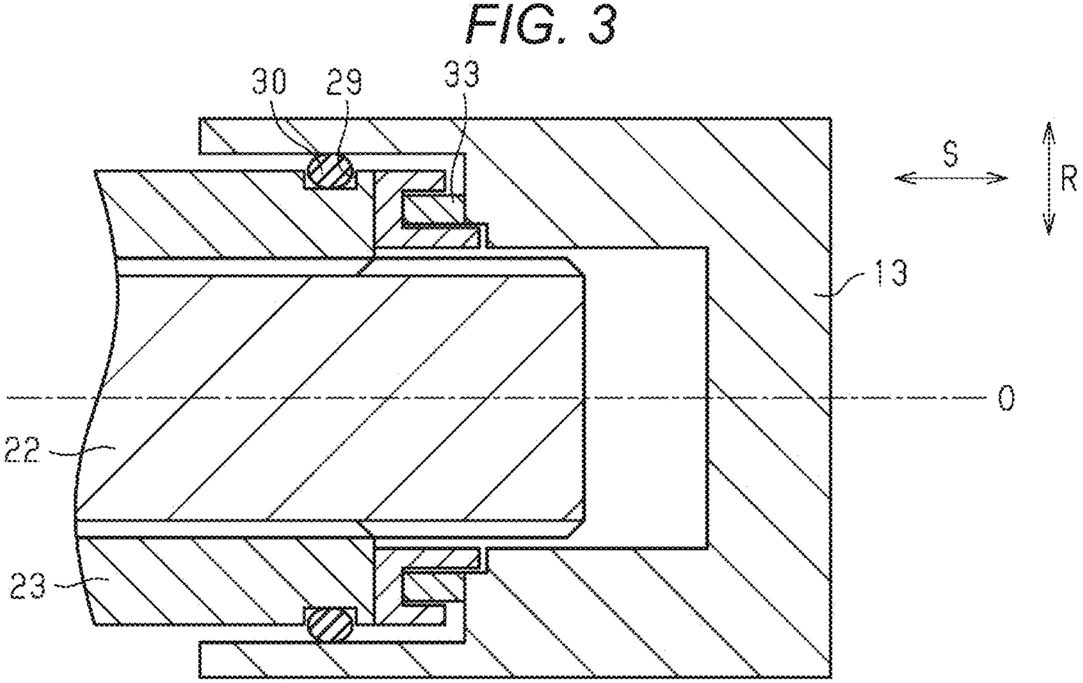
FIG. 3 is a cross-sectional view of a connection portion of a piston and a nut in a modification of the electric cylinder device in FIG. 1.
Figure 4:
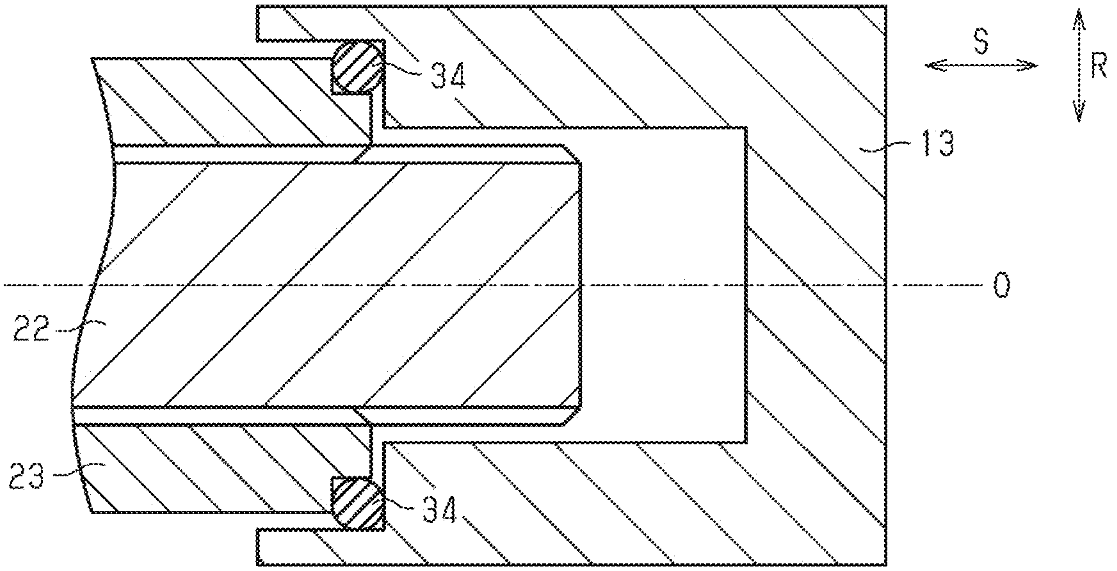
FIG. 4 is a cross-sectional view of the piston in the modification of the electric cylinder device in FIG. 1 and a periphery thereof.

- In the above embodiment, a contact surface of the piston 13 with the protruding spherical surface 32 of the nut 23 is the tapered surface 31. A shape of the contact surface of the piston 13 with the protruding spherical surface 32 may be changed. For example, the contact surface of the piston 13 with the protruding spherical surface 32 may be a recessed spherical surface having a curvature smaller than that of the protruding spherical surface 32 or a flat surface orthogonal to the linear motion direction S. In this case, the contact between the nut 23 and the piston 13 in the linear motion direction S is linear contact. Accordingly, in this case, the uneven wear on the components due to both the deviation of the center position of the piston 13 and the cylinder 11 and the inclination of the rotation axis O with respect to the central axis of the cylinder 11 can also be prevented.
- The contact surface of the piston 13 with the protruding spherical surface 32 of the nut 23 may be a recessed spherical surface having the same curvature as that of the protruding spherical surface 32. Further, the contact surface between the nut 23 and the piston 13 may be a flat surface orthogonal to the linear motion direction S. In this case, the contact between the nut 23 and the piston 13 in the linear motion direction S is surface contact. Accordingly, in this case, the uneven wear on the components due to the deviation of the center position of the piston 13 and the cylinder 11 can also be prevented.
- As shown in FIG. 3, the nut 23 and the piston 13 are disposed such that the gap is interposed between the nut 23 and the piston 13 in the linear motion direction S. Then, an elastic component 33 different from the seal ring 30 may be sandwiched in the gap, that is, a gap between the nut 23 and the piston 13 in the radial direction R. In this case, the elastic component 33 allows the inclined motion of the piston 13 with respect to the nut 23 by the elastic deformation. Therefore, the uneven wear on the components due to both the deviation of the center position of the piston 13 and the cylinder 11 and the inclination of the rotation axis O with respect to the central axis of the cylinder 11 can be prevented.
- As shown in FIG. 4, an elastic component 34 may be disposed between the nut 23 and the piston 13 in a state of being sandwiched in both the linear motion direction S and the radial direction R. In this case, the elastic component 34 allows the inclined motion of the piston 13 with respect to the nut 23 by the elastic deformation. Therefore, the uneven wear on the components due to both the deviation of the center position of the piston 13 and the cylinder 11 and the inclination of the rotation axis O with respect to the central axis of the cylinder 11 can be prevented. In addition, the elastic component 34 also has a function of the seal ring 30 according to the above embodiment. That is, the elastic component 34 transmits a thrust from the nut 23 to the piston 13 through friction when the piston 13 linearly moves rearward. Therefore, the same effect as in the case of FIG. 3 can be obtained only by the single elastic component 34.

Figure 5:
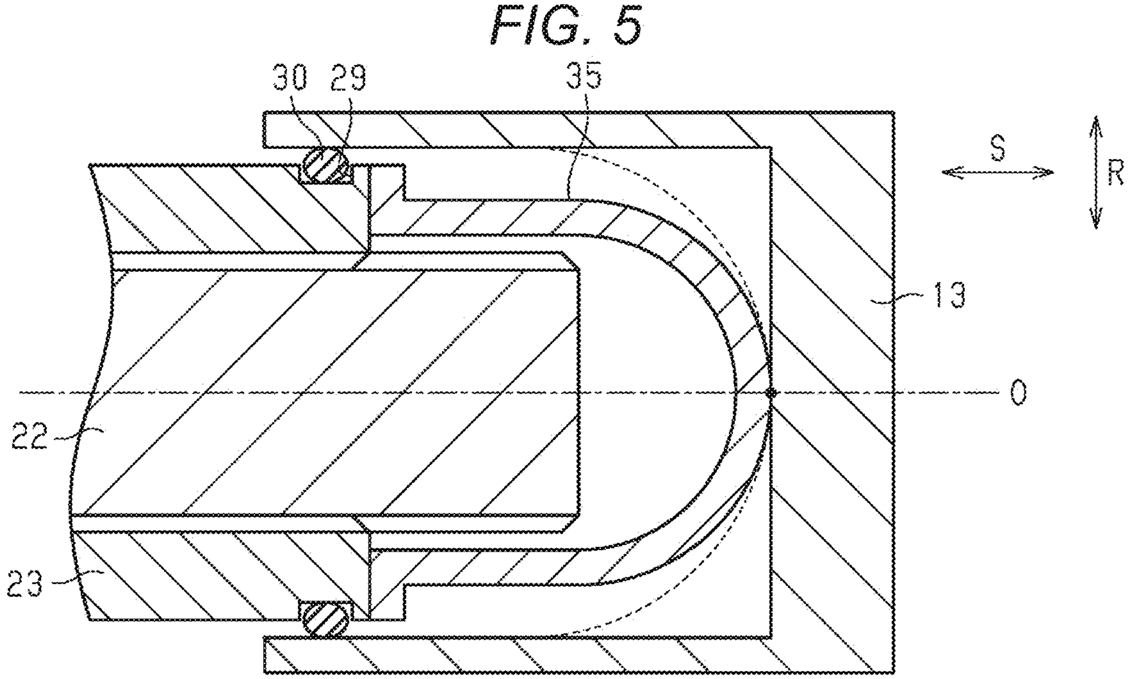
FIG. 5 is a cross-sectional view of the piston in the modification of the electric cylinder device in FIG. 1 and the periphery thereof.

As shown in FIG. 5, a cap component 35 having a hemispherical front end may be fixed to the nut 23, so that the cap component 35 may be in contact with the piston 13. In this case, the cap component 35 is in point contact with the piston 13. In this case, the inclination of the piston 13 with respect to the nut 23 is also allowed. Therefore, the uneven wear on the components due to both the deviation of the center position of the piston 13 and the cylinder 11 and the inclination of the rotation axis O with respect to the central axis of the cylinder 11 can be prevented. As indicated by a solid line in FIG. 5, a contact surface of the piston 13 with the cap component 35 may be a flat surface orthogonal to the linear motion direction S. In addition, as shown by a broken line in FIG. 5, the contact surface of the piston 13 with the cap component 35 may be a recessed spherical surface having a curvature smaller than that of a front end portion of the cap component 35. In the case of the recessed spherical surface, a strength of the piston 13 is higher than in the case of the flat surface.

Figure 6:
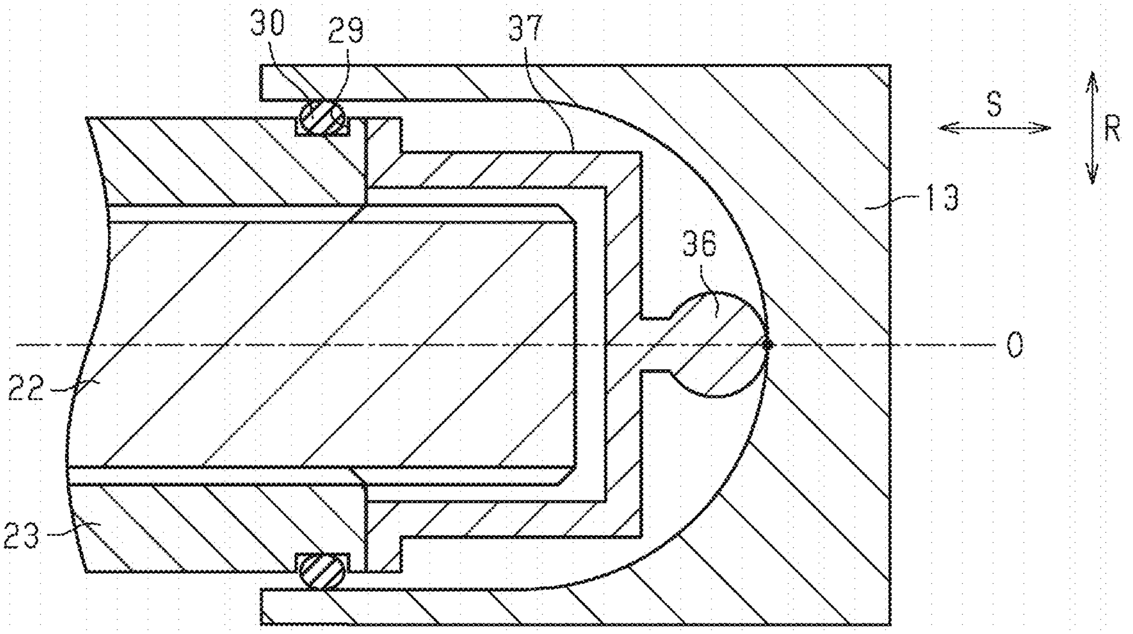
FIG. 6 is a cross-sectional view of the piston in the modification of the electric cylinder device in FIG. 1 and the periphery thereof.

As shown in FIG. 6, a cap component 37 having a spherical projection 36 at the front end may be fixed to the nut 23. In this case, since the spherical projection 36 of the cap component 37 is in point contact with the piston 13, the inclination of the piston 13 with respect to the nut 23 is also allowed. Accordingly, in this case, the uneven wear on the components due to both the deviation of the center position of the piston 13 and the cylinder 11 and the inclination of the rotation axis O with respect to the central axis of the cylinder 11 can also be prevented. In the case of FIG. 6, the contact surface of the piston 13 with the spherical projection 36 is a spherical surface having a curvature smaller than that of the spherical projection 36, and may be a flat surface perpendicular to the linear motion direction S.

Figure 7:
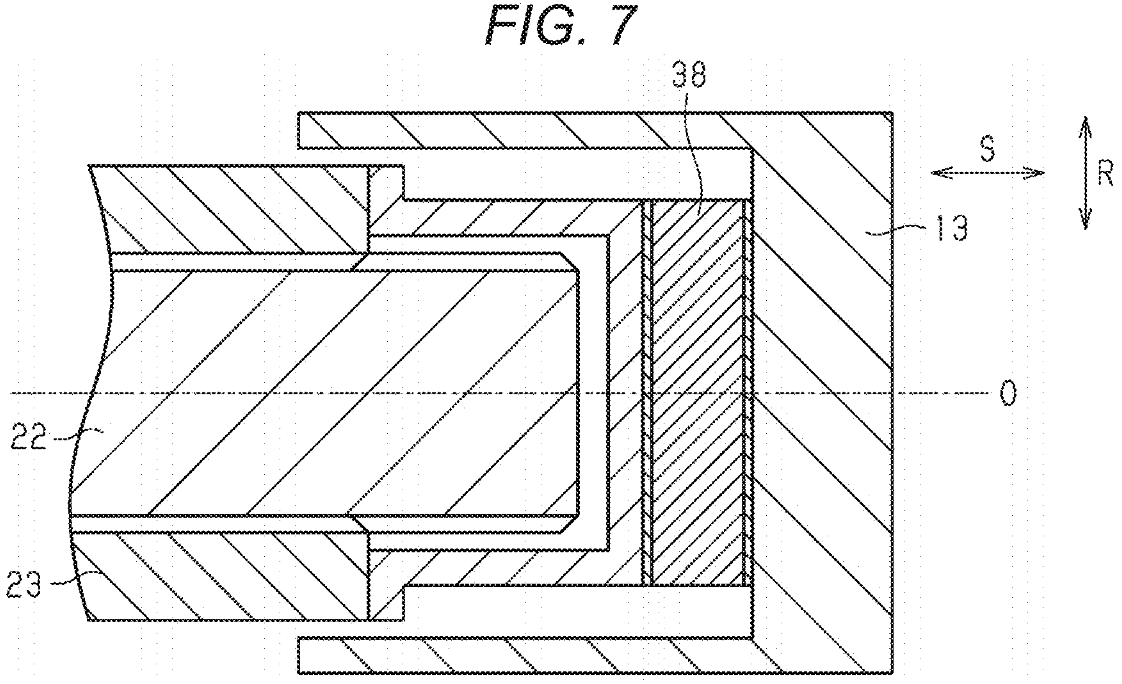
FIG. 7 is a cross-sectional view of the piston in the modification of the electric cylinder device in FIG. 1 and the periphery thereof.

As shown in FIG. 7, an elastic component 38 is disposed in a state of being sandwiched between the nut 23 and the piston 13 in the linear motion direction S. The elastic component 38 may be fixed to both the nut 23 and the piston 13 by adhesion or the like. In this case, the elastic component 38 allows the relative displacement and the inclination of the piston 13 with respect to the nut 23 in the radial direction R by the elastic deformation. Accordingly, in this case, the uneven wear on the components due to both the deviation of the center position of the piston 13 and the cylinder 11 and the inclination of the rotation axis O with respect to the central axis of the cylinder 11 can also be prevented. In addition, since the elastic component 38 is fixed to both the nut 23 and the piston 13, a thrust can be transmitted from the nut 23 to the piston 13 when the piston 13 linearly moves forward or rearward.

Figure 8:
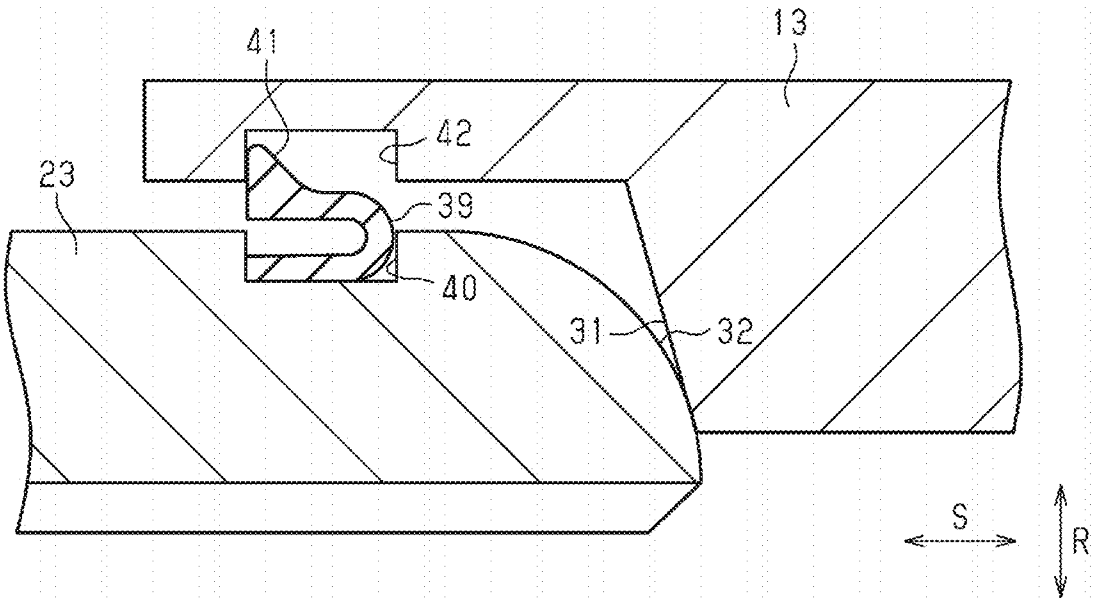
FIG. 8 is a cross-sectional view of the piston in the modification of the electric cylinder device in FIG. 1 and the periphery thereof.

A connection component 39 as shown in FIG. 8 may be provided instead of the seal ring 30. The connection component 39 is disposed in an attachment groove 40 provided on an outer periphery of the nut 23. The connection component 39 has a projection 41 protruding outward from the attachment groove 40 in the radial direction R. When the connection component 39 applies pressure to the projection 41 inward in the radial direction R, the connection component 39 is elastically deformed so that a projection amount of the projection 41 from the attachment groove 40 is reduced. On the other hand, an engaging groove 42 in which the projection 41 can be engaged is formed on an inner periphery of the piston 13. The nut 23 and the piston 13 are connected in a state in which the projection 41 of the connection component 39 is engaged with the engaging groove 42. In this case, when the piston 13 is retreated, a thrust is transmitted from the nut 23 to the piston 13 through the connection component 39. During the assembly of the electric cylinder device 10, a tip end portion of the nut 23 to which the connection component 39 is attached is inserted into the recessed portion 29 of the piston 13, whereby the piston 13 and the nut 23 are connected to each other by snap fit engagement. Therefore, it is easy to connect the nut 23 and the piston 13 during the assembly of the electric cylinder device 10.

Second Embodiment

Next, an electric cylinder device according to a second embodiment will be described in detail with reference to FIGS. 9 to 11. In the embodiment, the same components as those in the above embodiment are denoted by the same reference numerals, and a detailed description thereof is omitted.

Configuration of Electric Cylinder Device 110 of Second Embodiment

Figure 9:
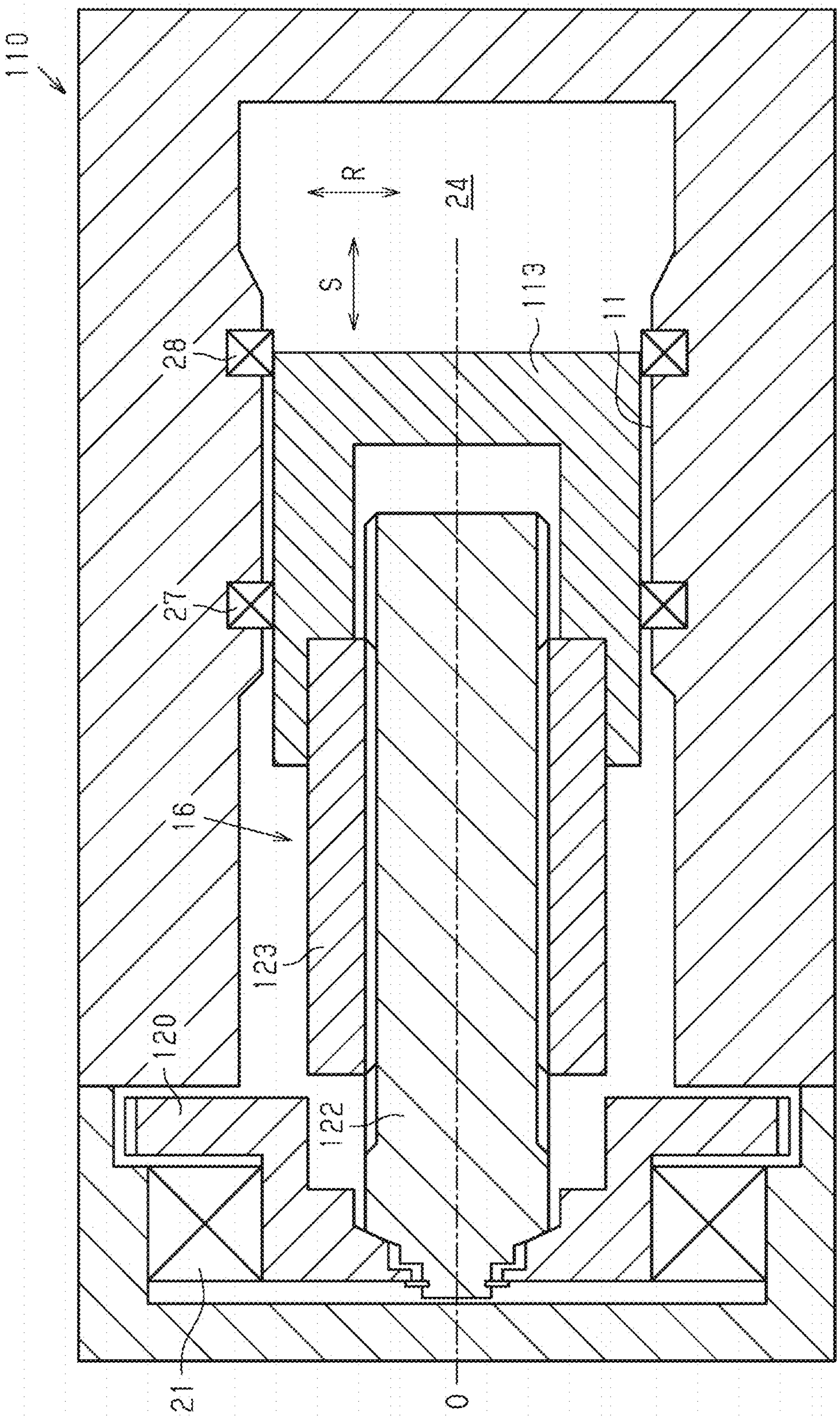
FIG. 9 is a cross-sectional view of an electric cylinder device according to a second embodiment.

FIG. 9 is a cross-sectional view of an electric cylinder device 110 according to the second embodiment. Although not shown in the cross section in FIG. 9, the electric cylinder device 110 according to the embodiment includes the electric motor 14, the first gear 18, the second gear 19, the input port 25, and the output port 26, similarly to the electric cylinder device 10 in FIG. 1. In addition, the electric cylinder device 110 includes a piston 113 integrally connected to a nut 123. That is, the piston 113 of the electric cylinder device 110 is connected to the nut 123 in a state in which relative displacement with respect to the nut 123 in the radial direction R is not allowed. On the other hand, in the electric cylinder device 110 according to the embodiment, a third gear 120 and a screw shaft 122 are connected to each other in a state in which the relative displacement in the radial direction R and the inclined motion of the rotation axis O are allowed.

Figure 10:
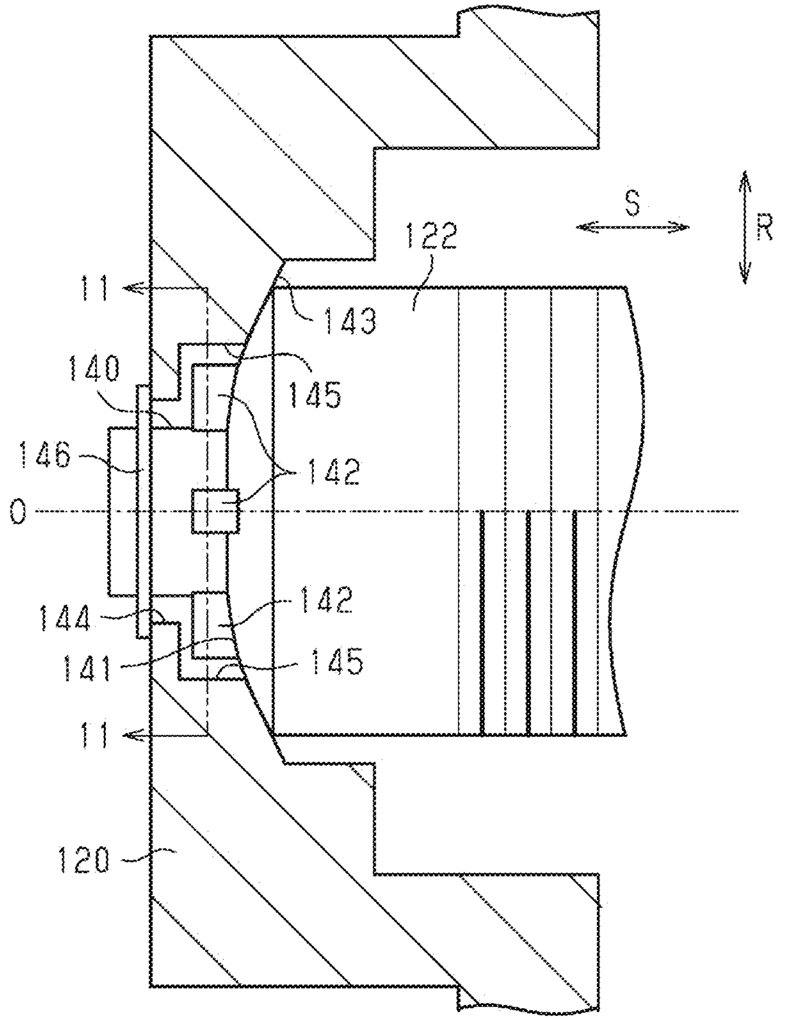
FIG. 10 is a cross-sectional view of a connection portion of a screw shaft and an input gear in the electric cylinder device in FIG. 9.
Figure 11:
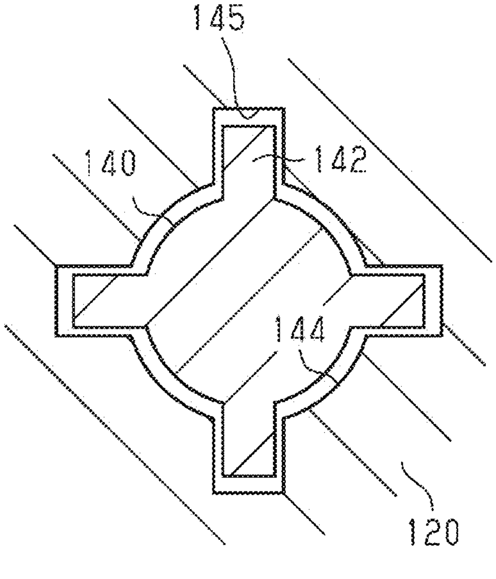
FIG. 11 is a cross-sectional view taken along a line 11-11 in FIG. 10.

FIG. 10 is a cross-sectional view of a connection portion between the third gear 120 and the screw shaft 122. In addition, FIG. 11 is a cross-sectional view of the connection portion taken along a line 11-11 in FIG. 10. As shown in FIG. 10, an insertion shaft 140 having a diameter smaller than that of another portion is provided at a rear end portion of the screw shaft 122. A step portion 141 between the insertion shaft 140 of the screw shaft 122 and another portion is a protruding spherical surface. In addition, the screw shaft 122 is provided with a projection 142 that protrudes outward from the insertion shaft 140 in the radial direction R. Although FIG. 11 shows four projections 142, the number of the projections 142 may be one or more.

On the other hand, the third gear 120 is provided with a tapered surface 143 inclined inward in the radial direction R as it goes rearward. In addition, the third gear 120 is provided with an insertion hole 144 that comes off from a rear end surface to the tapered surface 143. The insertion hole 144 has an inner diameter larger than an outer diameter of the insertion shaft 140. Engaging grooves 145 having the same number as the number of the projections 142 of the screw shaft 122 are provided around the insertion hole 144 so as to extend radially outward in the radial direction R.

When the third gear 120 and the screw shaft 122 are connected to each other, the insertion shaft 140 is inserted into the insertion hole 144 until the step portion 141 comes into contact with the tapered surface 143. Since the step portion 141 is a protruding spherical surface, contact between the step portion 141 and the tapered surface 143 is linear contact. At this time, a tip end of the insertion shaft 140 protrudes rearward from the third gear 120. A snap ring 146 for preventing the screw shaft 122 from coming off from the third gear 120 is attached to a portion of the insertion shaft 140 protruding rearward from the third gear 120, whereby the third gear 120 and the screw shaft 122 are connected to each other. As shown in FIG. 11, the third gear 120 and the screw shaft 122 are loosely fitted to each other in a state in which a gap is provided between the insertion shaft 140 and the insertion hole 144 and between the projection 142 and the engaging groove 145 in the radial direction R.

Operation and Effect of Second Embodiment

In the electric cylinder device 110 according to the embodiment, the third gear 120 and the screw shaft 122 are connected to each other in a state in which the gap is provided in the radial direction R. That is, the screw shaft 122 is connected to the third gear 120 in a state in which relative displacement in the radial direction R is allowed. The third gear 120 is assembled to the housing 12, in which the cylinder 11 is provided, through the bearing component 21. In addition, the screw shaft 122 is connected to the piston 113 through the nut 123. Accordingly, in the electric cylinder device 110, the relative displacement of the piston 113 with respect to the cylinder 11 in the radial direction R is allowed through the relative displacement of the screw shaft 122 with respect to the third gear 120 in the radial direction R. In addition, when the projection 142 meshes with the engaging groove 145, the rotation of the third gear 120 is transmitted to the screw shaft 122. Therefore, the electric cylinder device 110 according to the embodiment has an effect of preventing uneven wear on components due to deviation of a center position of the piston 113 and the cylinder 11. In addition, the electric cylinder device 110 has an effect of achieving the function of transmitting the rotation from the third gear 120, which is a rotation input component, to the screw shaft 122 which is a rotation portion. In the electric cylinder device 110 according to the embodiment, the screw shaft 122, which is the rotation portion of the linear motion conversion mechanism 16, corresponds to a first component, and the third gear 20, which is the rotation input component, corresponds to a second component. Further, the engaging groove 145 provided in the third gear 120, which is the rotation input component, corresponds to a first recessed portion, and the projection 142 provided in the screw shaft 122, which is the rotation portion of the linear motion conversion mechanism 16, corresponds to a second protruding portion.

In addition, the third gear 120 and the screw shaft 122 are connected to each other in a state in which the step portion 141 and the tapered surface 143, which are protruding spherical surfaces, are in line contact with each other. Accordingly, inclined motion of a rotation axis of the screw shaft 122 with respect to a rotation axis of the third gear 120 is allowed. Then, the inclination of the rotation axis O with respect to the central axis of the cylinder 11 is allowed due to the inclined motion of both the rotation axes. Therefore, the electric cylinder device 110 according to the embodiment has an effect of preventing the uneven wear on the components due to the inclination of the rotation axis O with respect to the central axis of the cylinder 11.

Modification of Second Embodiment

The embodiment can be modified and implemented as follows. The embodiment and the following modifications can be implemented in combination with each other within a technically consistent range.

Figure 12:
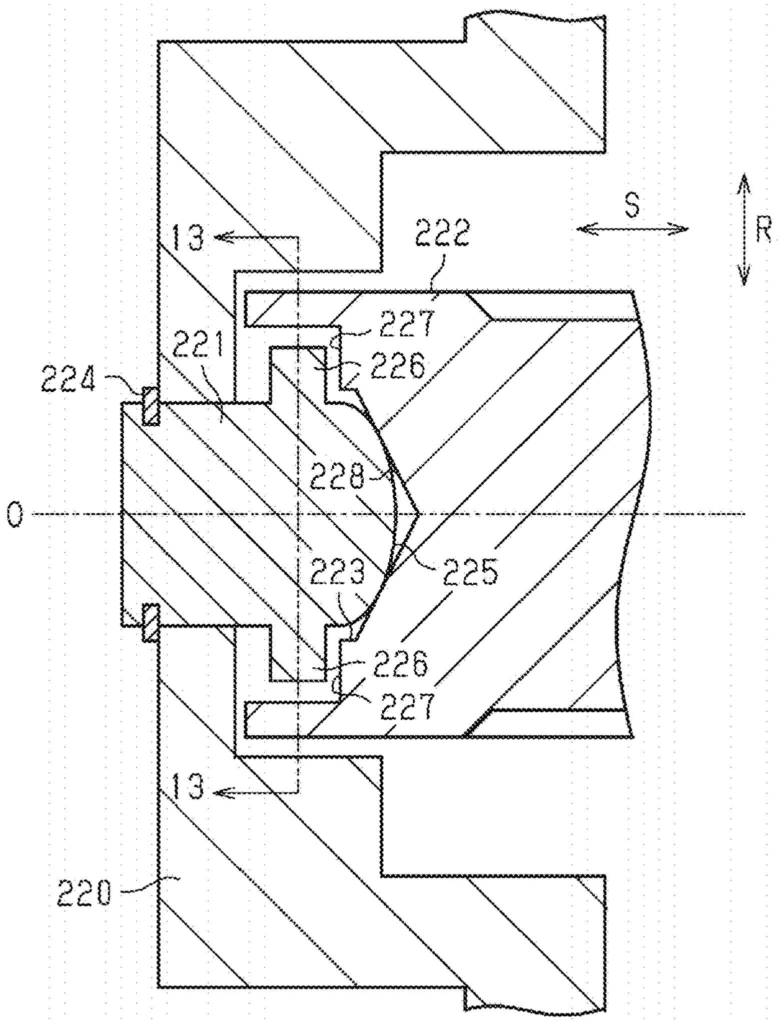
FIG. 12 is a cross-sectional view of a connection portion of a screw shaft and an input gear in a modification of the electric cylinder device in FIG. 9.
Figure 13:
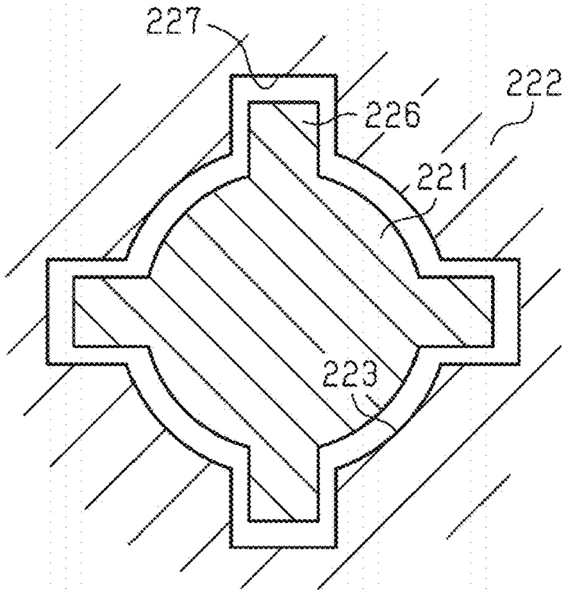
FIG. 13 is a cross-sectional view taken along a line 13-13 in FIG. 12.

As shown in FIGS. 12 and 13, an insertion shaft 221 may be provided in a third gear 220, and an insertion hole 223 may be provided in a screw shaft 222. The insertion shaft 221 protruding forward along the rotation axis O is integrally connected to the third gear 220 in FIG. 12 so as to rotate. A rear end portion of the insertion shaft 221 is fixed to the third gear 220 in a state in which the rear end portion protrudes rearward from the third gear 220. A snap ring 224 for preventing the insertion shaft 221 from coming off the third gear 220 is attached to a portion of the insertion shaft 140 protruding rearward from the third gear 220. In addition, a protruding spherical surface 225 is provided at a front end of the insertion shaft 221. In addition, a plurality of projections 226 is provided on a side surface of the insertion shaft 221 so as to project radially outward in the radial direction R. Although FIG. 13 shows four projections 226, the number of the projections 226 may be one or more. On the other hand, the screw shaft 222 is provided with the insertion hole 223 extending forward from a rear end thereof. The insertion hole 223 has an inner diameter larger than an outer diameter of the insertion shaft 221. In addition, the same number of engaging grooves 227 as the number of the projections 226 provided on the insertion shaft 221 are provided around the insertion hole 223 in the screw shaft 222 so as to extend radially outward in the radial direction R. When the projection 226 meshes with the engaging groove 227, rotation of the third gear 220 is transmitted to the screw shaft 222. The projection 226 and the engaging groove 227 are loosely fitted to each other. In addition, a front end of the insertion hole 223 is provided with a tapered surface 228 inclined inward in the radial direction R as it goes forward. The third gear 220 and the screw shaft 222 are connected to each other in a state in which the protruding spherical surface 225 of the insertion shaft 221 is in contact with the tapered surface 228 of the insertion hole 223. Contact between the protruding spherical surface 225 and the tapered surface 228 is linear contact. The third gear 220 and the screw shaft 222 connected in this manner allow relative displacement of the screw shaft 222 with respect to the third gear 220 in the radial direction R. Accordingly, in this case, there is also an effect of preventing uneven wear on components due to the deviation of the center position of the piston 113 and the cylinder 11. In addition, the third gear 220 and the screw shaft 222 are connected to each other in a line contact state, and inclined motion of a rotation axis of the screw shaft 222 with respect to a rotation axis of the third gear 220 is allowed. Therefore, in this case, the uneven wear on the components due to the inclination of the rotation axis O with respect to the central axis of the cylinder 11 is also prevented. In the modification, the projection 226 provided in the third gear 220 corresponds to a first protruding portion, and the engaging groove 227 provided in the screw shaft 222 corresponds to a second recessed portion.

The come-off of the screw shafts 122 and 222 from the third gears 120 and 220 may be performed by a method other than the snap ring 224.

The third gears 120 and 220 and the screw shafts 122 and 222 may be connected in a surface contact state. In this case, when the relative displacement of the screw shafts 122 and 222 with respect to the third gears 120 and 220 in the radial direction R is allowed, the uneven wear on the components due to the deviation of the center position of the piston 113 and the cylinder 11 can also be prevented.

Third Embodiment

Next, an electric cylinder device according to a third embodiment will be described in detail with reference to FIG. 14. In the embodiment, the same components as those in the above embodiment are denoted by the same reference numerals, and a detailed description thereof is omitted.

Configuration of Electric Cylinder Device 310 of Third Embodiment

Figure 14:
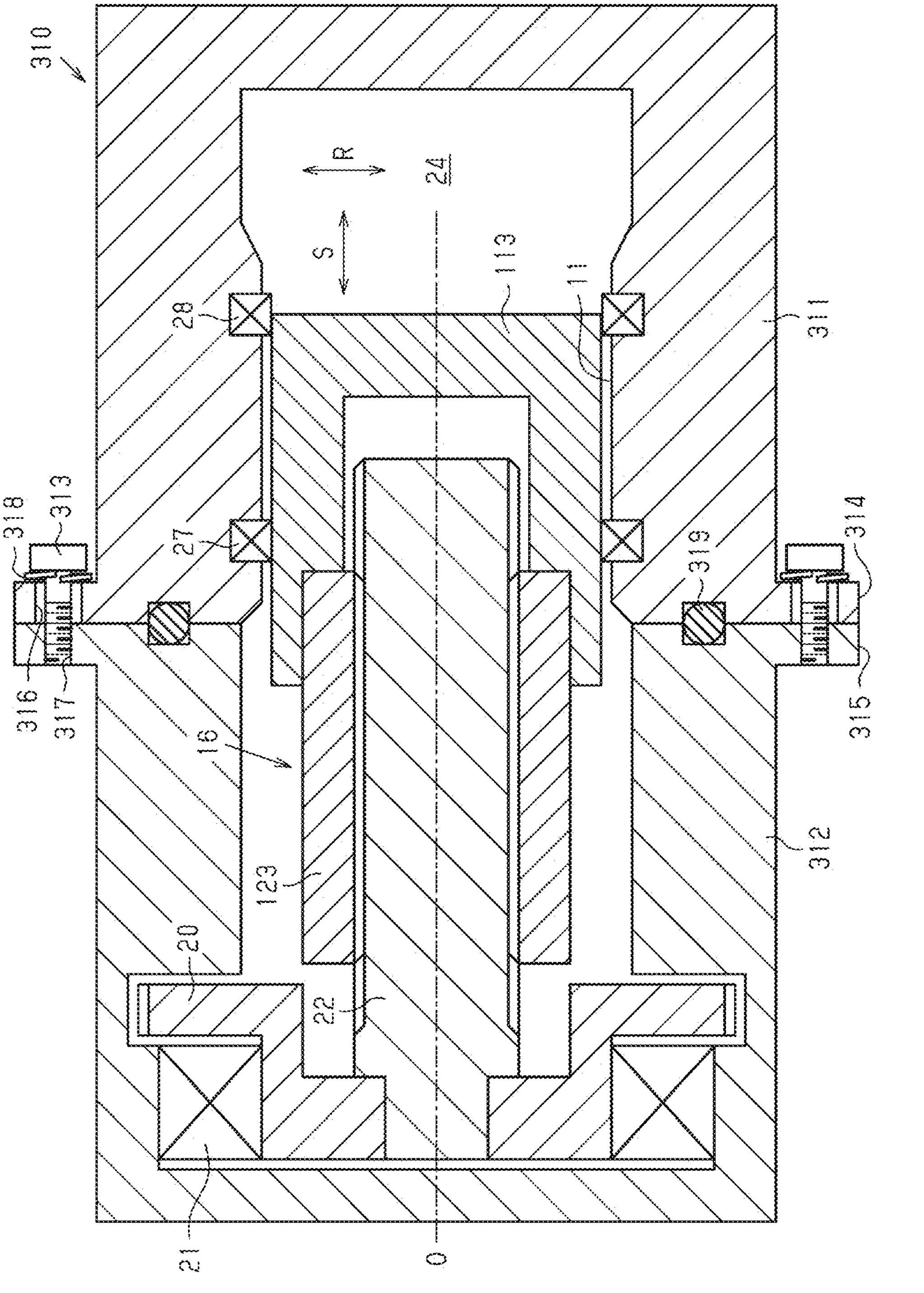
FIG. 14 is a cross-sectional view of an electric cylinder device according to a third embodiment.

FIG. 14 is a cross-sectional view of an electric cylinder device 310 according to the third embodiment. Although not shown in the cross section in FIG. 14, the electric cylinder device 310 according to the embodiment includes the electric motor 14, the first gear 18, the second gear 19, the input port 25, and the output port 26, similarly to the electric cylinder device 10 in FIG. 1. In addition, similarly to the electric cylinder device 110 in FIG. 9, the electric cylinder device 310 includes the piston 113 integrally connected to the nut 123. Further, similarly to the electric cylinder device 10 in FIG. 1, the electric cylinder device 310 includes the third gear 20 integrally connected to the screw shaft 22.

A housing of the electric cylinder device 310 in FIG. 14 includes a first housing component 311 in which the cylinder 11 is provided, and a second housing component 312 in which the third gear 20 is disposed. The first housing component 311 and the second housing component 312 are connected to each other so as to be relatively displaceable in the radial direction R in a state in which surfaces thereof orthogonal to the linear motion direction S are attached to each other.

In the case of FIG. 14, the first housing component 311 and the second housing component 312 are connected to each other using a plurality of bolts 313. Flanges 314 and 315 protruding outward in the radial direction R are respectively provided on outer peripheries of the first housing component 311 and the second housing component 312. The flange 314 of the first housing component 311 is provided with a through hole 316 penetrating the flange 314 in the linear motion direction S. The through hole 316 has an inner diameter larger than a shaft diameter of the bolt 313. On the other hand, the flange 315 of the second housing component 312 is provided with a screw hole 317 extending in the linear motion direction S. A female screw for screwing the bolt 313 is formed on an inner periphery of the screw hole 317. The bolt 313 is screwed into the screw hole 317 through the through hole 316 in a state in which a spring washer 318 is sandwiched between a head portion of the bolt 313 and the flange 314.

In addition, a ring-shaped seal ring 319 made of an elastic material is interposed between abutting surfaces of the first housing component 311 and the second housing component 312. The seal ring 319 is disposed to surround an outer side of the cylinder 11 in the radial direction R.

Operation and Effect of Third Embodiment

In the electric cylinder device 310 according to the embodiment, the first housing component 311 and the second housing component 312 are connected to each other in a state in which relative displacement in the radial direction R is allowed. The cylinder 11 is provided inside the first housing component 311. In addition, the third gear 20, to which the piston 113 is connected through the linear motion conversion mechanism 16, is attached to the inside of the second housing component 312. Therefore, in the electric cylinder device 310, the relative displacement of the piston 113 with respect to the cylinder 11 in the radial direction R is allowed through the relative displacement of the first housing component 311 and the second housing component 312 in the radial direction R. Therefore, the electric cylinder device 310 according to the embodiment has an effect of preventing uneven wear on components due to the deviation of the center position of the piston 113 and the cylinder 11. In addition, the embodiment merely divides the housing, and a structure inside the housing can maintain the structure in the related art. Therefore, there is an advantage that a change scale is small. In the electric cylinder device 310 according to the embodiment, the second housing component 312 corresponds to a first component, and the first housing component 311 corresponds to a second component.

Modification of Third Embodiment

When the relative displacement of the first housing component 311 and the second housing component 312 in the radial direction R is allowed, the first housing component 311 and the second housing component 312 may be connected as follows.

The first housing component 311 and the second housing component 312 are connected to each other by a method other than bolt fastening.

The seal ring 319 may be omitted.

The first housing component 311 and the second housing component 312 are connected to each other in a state in which a sheet made of an elastic material such as rubber is sandwiched between the abutting surfaces.

Fourth Embodiment

Next, an electric cylinder device according to a fourth embodiment will be described in detail with reference to FIG. 15. In the embodiment, the same components as those in the above embodiment are denoted by the same reference numerals, and a detailed description thereof is omitted.

Configuration of Electric Cylinder Device 410 of Fourth Embodiment

Figure 15:
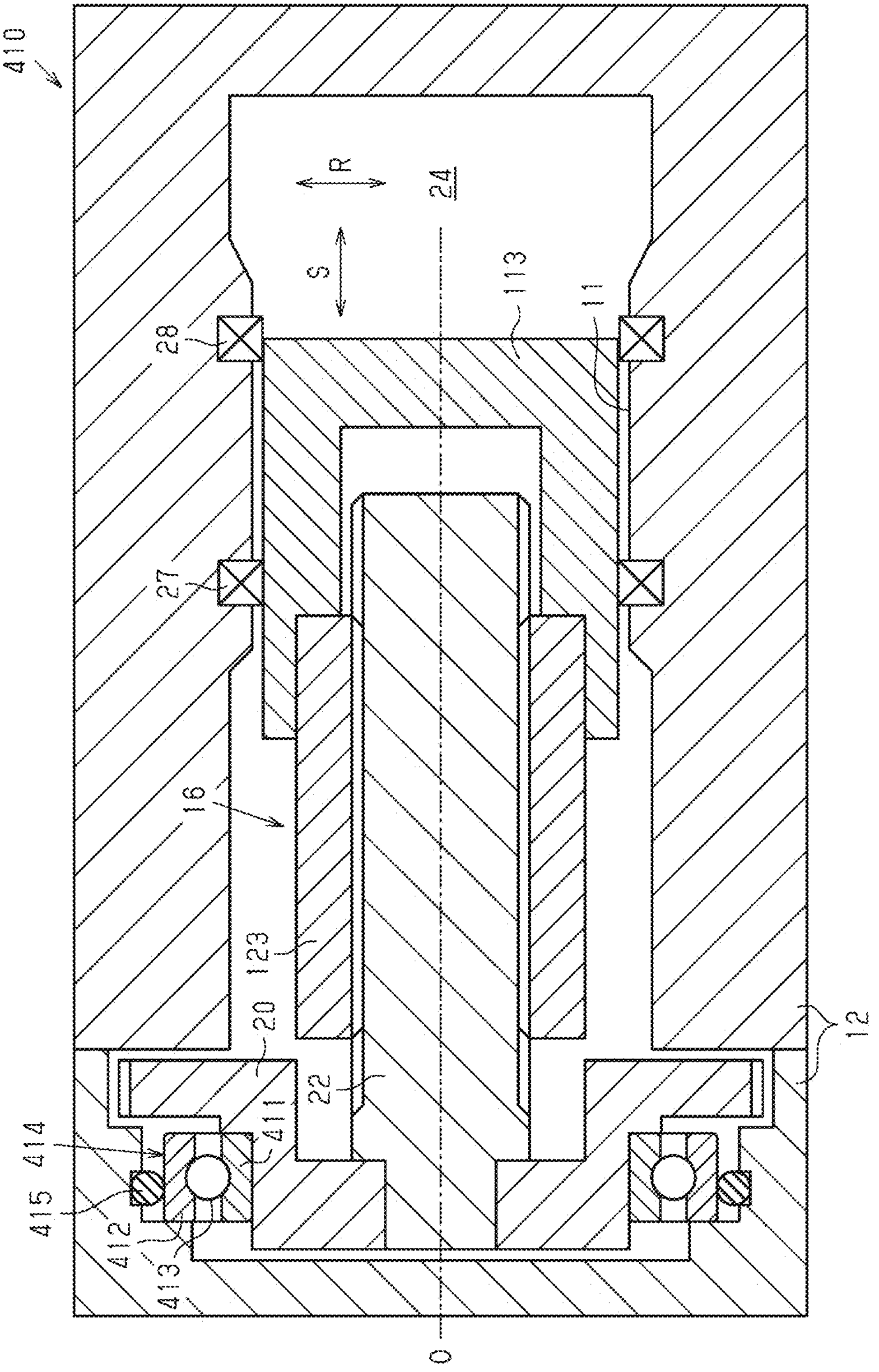
FIG. 15 is a cross-sectional view of an electric cylinder device according to a fourth embodiment.

FIG. 15 is a cross-sectional view of an electric cylinder device 410 according to the fourth embodiment. Although not shown in the cross section in FIG. 15, the electric cylinder device 410 according to the embodiment includes the electric motor 14, the first gear 18, the second gear 19, the input port 25, and the output port 26, similarly to the electric cylinder device 10 in FIG. 1. In addition, similarly to the electric cylinder device 110 in FIG. 9, the electric cylinder device 410 includes the piston 113 integrally connected to the nut 123. Further, similarly to the electric cylinder device 10 in FIG. 1, the electric cylinder device 410 includes the third gear 20 integrally connected to the screw shaft 22.

As shown in FIG. 15, the electric cylinder device 410 includes a rolling bearing 414, in which a rolling element 413 is interposed between an inner ring 411 and an outer ring 412, as a bearing component that rotatably supports the third gear 20. The inner ring 411 of the rolling bearing 414 is fixed to the third gear 20, and the outer ring 412 is fixed to an inner wall of the housing 12. The inner ring 411 is attached to the third gear 20 in a state in which an inner peripheral surface and a front side surface thereof are in contact with the third gear 20. The outer ring 412 is attached to the housing 12 in a state in which a rear side surface thereof is in contact with the inner wall of the housing 12. Further, a seal ring 415, which is an elastic component, is interposed between an outer peripheral surface of the outer ring 412 and the inner wall of the housing 12. That is, the rolling bearing 414 is attached to the housing 12 in a state in which relative displacement in the radial direction R is allowed by elastic deformation of the seal ring 415. The third gear 20, to which the piston 113 is connected through the linear motion conversion mechanism 16, is connected to the inner wall of the housing 12 through the rolling bearing 414. Therefore, in the electric cylinder device 410, the piston 113 is disposed in a state in which the relative displacement in the radial direction R with respect to the housing 12, in which the cylinder 11 is provided, is allowed.

Operation and Effect of Fourth Embodiment

In the electric cylinder device 410 according to the embodiment, the relative displacement of the piston 113 with respect to the cylinder 11 in the radial direction R is allowed through the relative displacement of the rolling bearing 414 with respect to the housing 12 in the radial direction R. Therefore, the electric cylinder device 410 according to the embodiment has an effect of preventing uneven wear on components due to the deviation of the center position of the piston 113 and the cylinder 11. In addition, in the embodiment, since the relative displacement at a place far from a tip end of the piston 113 is allowed, the uneven wear can be effectively prevented. When the rolling bearing 414 moves too freely, looseness in the shaft increases. Therefore, it is preferable to provide an aligning function by providing an elastic component between the rolling bearing 414 and the housing 12. In the electric cylinder device 410 according to the embodiment, the rolling bearing 414 corresponds to a first component, and the housing 12 corresponds to a second component.

Modification of Fourth Embodiment

The embodiment can be modified and implemented as follows. The embodiment and the following modifications can be implemented in combination with each other within a technically consistent range.

Figure 16:
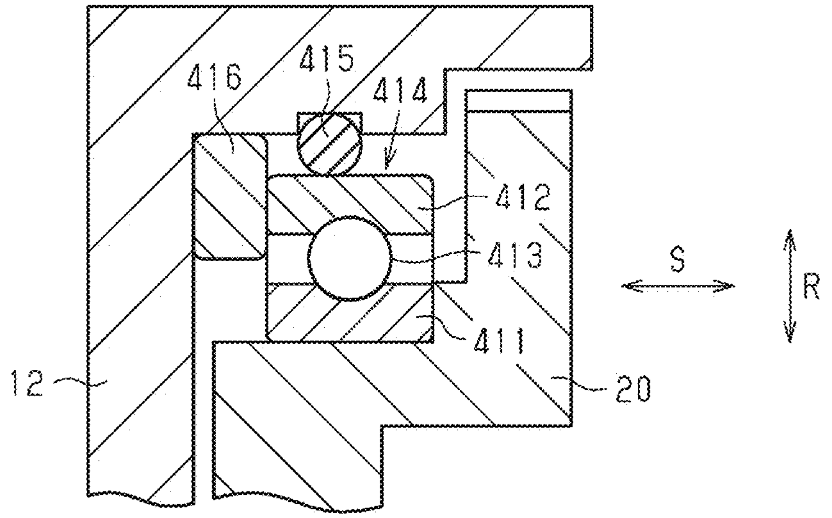
FIG. 16 is a cross-sectional view of a bearing in a modification of the electric cylinder device in FIG. 15 and a periphery thereof.

As shown in FIG. 16, an elastic component 416 may be interposed between a rear side surface of the outer ring

412 of the rolling bearing 414 and the inner wall of the housing 12. In this case, the inclined motion of the rotation axis of the third gear 20 with respect to the housing 12 is allowed through elastic deformation of the elastic component 416. Therefore, the uneven wear on the components due to the inclination of the rotation axis O with respect to the central axis of the cylinder 11 is prevented.

The seal ring 415 may be interposed between the inner peripheral surface of the inner ring 411 of the rolling bearing 414 and the third gear 20. In this case, the relative displacement of the piston 113 with respect to the cylinder 11 in the radial direction R is also allowed by the elastic deformation of the seal ring 415. Therefore, in this case, the uneven wear on the components due to the deviation of the center position of the piston 113 and the cylinder 11 can also be prevented.

Modifications of Embodiments

The above embodiments can be modified and implemented as follows. The above embodiments and the following modifications can be implemented in combination with each other within a technically consistent range.

The number of gears constituting the rotation transmission mechanism 15 may be changed.

A mechanism other than the gear mechanism shown in FIG. 1 may be adopted as the rotation transmission mechanism 15. As a mechanism that can be adopted as the rotation transmission mechanism 15, for example, there are a winding transmission mechanism and a planetary gear mechanism. In that case, the rotation component connected to the rotation portion of the linear motion conversion mechanism 16 in the rotation transmission mechanism 15 is a component corresponding to the rotation input component.

The electric motor 14 may be directly connected to the linear motion conversion mechanism 16 without providing the rotation transmission mechanism 15. In this case, the motor shaft 17 is a component corresponding to the rotation input component.

A mechanism in which the screw shaft linearly moves according to the rotation of the nut, that is, a mechanism in which the nut is the rotation portion and the screw shaft is the linear motion portion may be adopted in the linear motion conversion mechanism 16. In this case, the nut is connected to the rotation input component, and the screw shaft is connected to the pistons 13 and 113. The connection structure between the nut 23 and the piston 13 in the first embodiment and the modification thereof can be adopted as a connection structure between the screw shaft and the piston 13 in this case.

The electric cylinder device according to each of the above embodiments and the modifications thereof may be an electric cylinder device for a dry type braking device that generates a braking force by directly transmitting the pressure of the piston to the friction member due to a change that the piston directly applies the pressure to the outside. In addition, the electric cylinder device according to each of the above embodiments and the modifications may be used for applications other than the braking device.

The invention claimed is:

1. An electric cylinder device comprising:

a piston disposed inside a cylinder so as to bound a fluid chamber into which fluid is introduced within the cylinder only on one side of the piston in an axial direction of the piston, the piston configured to change a volume of the fluid chamber by a moving position thereof;

a rotation input component that rotates by receiving rotation of an electric motor;

a linear motion conversion mechanism that includes a rotation portion that is rotated due to transmission of the rotation of the rotation input component and a linear motion portion that is disposed inside the cylinder on the opposite side of the piston from the fluid chamber in the axial direction of the piston, and the linear motion portion moves the piston linearly by linearly moving according to the rotation of the rotation portion; and a housing in which the cylinder is provided and in which the piston, the rotation input component, and the linear motion conversion mechanism are accommodated, wherein the piston and the linear motion portion, which are two components among components of the electric cylinder device, are allowed to undergo relative displacement in a radial direction that is a direction orthogonal to the axial direction of the piston, the piston and the linear motion portion include a portion overlapping in the axial direction, and an elastic component is provided in a gap of the overlapping portion in the radial direction, and the elastic component is capable of transmitting a thrust that moves the piston toward a side which causes the volume of the fluid chamber to increase from the linear motion portion to the piston by contact between the piston and the linear motion portion via the elastic component.

* * * * *